Jan. 13, 1925.
J. GASPARI
EYEGLASSES
Filed Feb. 23, 1924
1,522,620
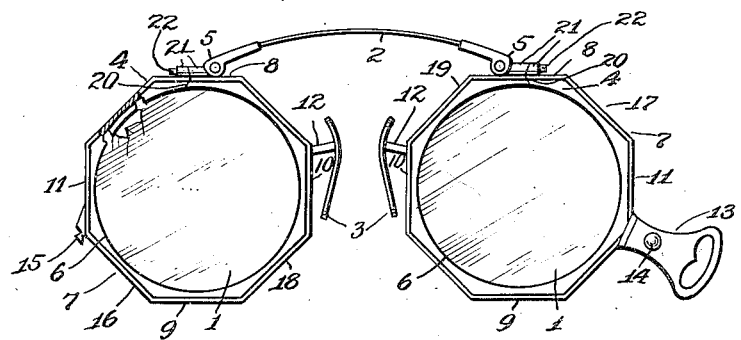
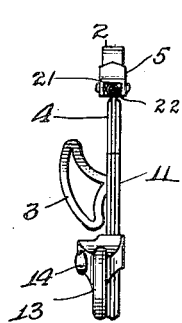
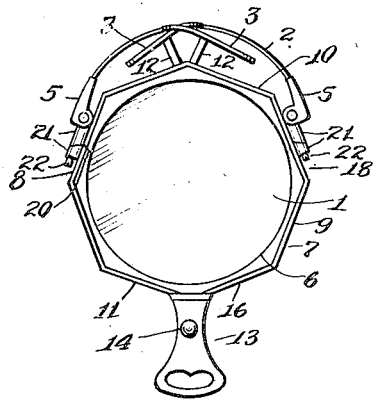
Inventor
Joseph Gaspari
By his Attorney
William F. Nickel Patented Jan. 13, 1925.

1,522,620

UNITED STATES PATENT OFFICE.

JOSEPH GASPARI, OF NEW YORK, N. Y.

EYEGLASSES.

Application filed February 23, 1924. Serial No. 694,737.

*To all whom it may concern:*

Be it known that I, JOSEPH GASPARI, a subject of the King of Italy, residing in New York, in the county of New York and State of New York, have invented certain new and useful Improvements in Eyeglasses, of which the following is a specification.

I have invented an improvement in eyeglasses, preferably eyeglasses having lenses connected by a bridge and nose grips to hold the eyeglasses in position before the wearer's face.

An object of the invention is to provide a structure embracing a novel combination of lens and rim, by which an ordinary lens can be mounted in a rim or frame of special design and all need of the lens being made to correspond particularly with the style of the rim used, is obviated.

Other objects and advantages of the invention will appear in the following description; taken with the drawings, which show the preferred form of my invention, and the novel features of the improvement are pointed out in the appended claims. The disclosure, however, is explanatory only and I may change the shape, size and arrangement of the various parts within the scope and spirit of the invention, as indicated by the broad and general meanings of the terms in which the claims are expressed.

On the drawings:

Figure 1 is a view of a pair of eyeglasses according to my invention, viewed from the side which is closest to the wearer's face when the eyeglasses are put on;

Figure 2 is an end view seen from the right of Figure 1; and

Figure 3 is a view of the eyeglasses folded together.

The same numerals identify the same parts throughout.

The drawings show a pair of lenses 1 connected by a bridge 2, the eyeglasses also comprising nose guards 3 to grip the nose of the wearer. The lenses 1 are enclosed within rims or frames 4, to which the nose guards are fastened; and the bridge is joined at its ends to these rims to connect the two lenses together. The ends of the spring bridge 2 are united to the rims by means of spring hinges indicated at 5; so that when the eyeglasses are of the folding type, the lenses and rims can be moved about the pivots of these hinges at the ends of the bridge 2 until they coincide with and overlie each other. I of course do not show the structural details of these spring hinges, as they may be of any preferred type, and are not essential parts of my inventive idea. Further, I do not desire to be limited to folding eyeglasses, as I also may employ ordinary eyeglasses in which the spring hinge is fastened rigidly, without hinges, at its ends to the rims 4, so as to keep the lenses 1 always distended and separated.

The inner edges or outlines 6 of the rims 4 are shown as smooth curves or circles, but the outer edge or perimeter 7 of these rims is polygonal in shape. As shown, they have eight sides and are regular in form, and when the eyeglasses are in such position that the line joining the centres of the eyeglasses is horizontal, the top edges 8 of the two rims will be horizontal and so will the bottom edges 9; the ends of the bridge 2 being connected to the tops as shown. Also the inner ends of the two rims indicated at 10 will be vertical and so will the outer ends 11. The nose guards 3 will be secured to the outer ends of shanks or posts 12; which are rigid with the frames 3, and are preferably attached to the upper portions of the inner ends 10.

One of the frames, shown as the frame 4 at the right, is provided with a handle 13 at the junction of the side which connects the outer end 11 to the bottom 9, and this handle will have a catch operated by a button 14. The other rim will have in similar position, at the corner of the side which joins the bottom 9 to the outer end 11, a hook 15, so that when the rims and lenses are folded together, the hook will be engaged by the catch; and to enable the bridge 2 to distend the lenses, one merely pulls back the button 14 to release the hook 15.

The bridge 2, posts 12, handle 13, and hook 15 are all secured in particular positions when the eyeglasses are folding eyeglasses; because when the eyeglasses are folded, as by moving the frame and lens at the left over upon the frame and lens at the right, the side 16 joining the bottom 9 to the outer end 11 of the frame at the left will have to coincide with the outer end 11 of the frame at the right. The bottom of the frame at the left will coincide with the side 17 joining the top 8 and the end 11 of the frame at the right; the side 18 joining the bottom 9 and inner end 10 of the frame at the left will coincide with the top 8 of the frame at the right; and the inner end 10 of the left frame will fall upon the edge 19 joining the top 8 and inner end 10 of the frame at the right. Thus in folding the eyeglasses, the two nose guards will be moved close together and the bridge 2 will span them.

I do not wish to limit myself to an octagon, as a frame of any polygonal shape, such as hexagonal, may also be employed.

The inside of the frames or rims 4 are grooved to receive the circular lenses 1; and such a shape of rim enables me to employ an ordinary lens inside of a rim having a polygonal shape without making the lens correspond in shape to the rim. Thus the cost of manufacturing the device is greatly lessened and so is the cost of replacing the lens in cases one is broken.

In polygonal rims now employed, the inside outline 6 is polygonal, as well as the outer perimeter 7; and when an octagon rim is chosen, the lens to fit must be produced by cutting off the corners of a square lens and trimming and beveling the edges. Such an eight-sided lens is very expensive; and my rims 4, having a circular inner outline, enable an eight-sided lens to be dispensed with and the usual round lens, always carried in stock, to be mounted therein and removed or replaced whenever necessary, without adding in any way to the cost of the article.

Both the frames 4 may be cut through at 20 in the tops 8 adjacent the spring hinges 5; and be fastened by threaded lugs 21, and screws 22 passing through the lugs, on opposite sides of the point where the cut is made; so that the frames can be loosened and the lenses removed whenever desired.

Having described my invention, what I believe to be new and desire to secure and protect by Letters Patent of the United States is:—

1. Eyeglasses comprising a pair of rims each having a circular inner edge and a polygonal outer configuration, round lenses enclosed by the rims, the tops of said rims being in line with each other, a bridge piece joined at its ends to said rims, and a nose guard secured to each rim at its inner end and adjacent a corner in the outer perimeter thereof.

2. Eyeglasses comprising a pair of rims each having a circular inner edge and a polygonal outer configuration, round lenses enclosed by the rims, the tops of said rims being in line with each other, a bridge piece joined at its ends to the tops of said rims, and a nose guard secured to each rim at its inner end and adjacent a corner in the outer perimeter thereof.

3. Eyeglasses comprising a pair of rims, each having a circular inner edge and a polygonal outer configuration, round lenses enclosed by the rims, the tops of said rims being in line with each other, a spring bridge piece hinged at its ends to said tops, a nose guard secured to each rim at its inner end adjacent a corner in the outer perimeter thereof, and a hook on one rim and a catch on the other at the outer ends of said rims, and substantially opposite the nose guard on each rim, as described.

In testimony whereof, I have signed my name to this specification this 23 day of March, 1923.

JOSEPH GASPARI.